United States Patent [19]

Van Der Ploeg

[11] Patent Number: 4,628,889
[45] Date of Patent: Dec. 16, 1986

[54] DEVICE TO PREHEAT A FUEL MIXTURE

[75] Inventor: Arie Van Der Ploeg, VA Wierden, Netherlands

[73] Assignee: Texas Instruments Incorporated, Dallas, Tex.

[21] Appl. No.: 768,531

[22] Filed: Aug. 22, 1985

[51] Int. Cl.$^4$ .............................................. F02M 31/00
[52] U.S. Cl. .................................... 123/549; 123/552; 123/548; 219/206
[58] Field of Search ............... 123/552, 549, 547, 548; 261/142; 219/205, 206, 207, 275, 539, 540, 541

[56] References Cited

U.S. PATENT DOCUMENTS

| | | | |
|---|---|---|---|
| 2,587,713 | 3/1952 | Elliott | 123/549 |
| 3,987,772 | 10/1976 | McBride | 123/549 |
| 4,242,999 | 1/1981 | Hoser . | |
| 4,313,413 | 2/1982 | Miyoshi | 123/549 |
| 4,325,344 | 4/1982 | Igashira | 123/549 |
| 4,347,826 | 9/1982 | Nomura | 123/549 |
| 4,356,804 | 11/1982 | Igashira | 123/549 |
| 4,359,974 | 11/1982 | Igashira | 123/549 |
| 4,387,291 | 6/1983 | Keppel | 123/549 |
| 4,465,053 | 8/1984 | Berg | 123/549 |
| 4,467,773 | 8/1984 | Chiavaroli | 123/549 |

FOREIGN PATENT DOCUMENTS 60849 5/1981 Japan .
154155 11/1981 Japan .................................. 123/549

Primary Examiner—Ronald H. Lazarus
Attorney, Agent, or Firm—James P. McAndrews; John A. Haug; Melvin Sharp

[57] ABSTRACT

A device preheats a fuel mixture in an intake manifold of a combustion engine, the device corresponding a cylindrical body having a side wall and a bottom disposed in the wall of the intake manifold. The body is arranged on an electro- and heat insulating contact bearer and is secured on the intake manifold in an electro- and heat conducting way, the bottom of the body being provided with PTC pills which are connected to a current conductor and are secured on the bottom in an electro- and heat conducting way. The bottom has such a thickness and shape that during preheating the fuel mixture a homogeneous heat conduction is created, the side wall of the body having securing means to secure the preheater, and wherein it has such a thickness that together with the securing means it provides the required heat resistance upon heat transfer from and to the intake manifold.

9 Claims, 6 Drawing Figures

DEVICE TO PREHEAT A FUEL MIXTURE

BACKGROUND OF THE INVENTION

The invention relates to a device to preheat a fuel mixture in an intake manifold of a combustion engine or the like.

The device comprises a cylindrical body having a side wall and a bottom which is provided in a cavity of the wall of the intake manifold, said body being arranged on an electro- and heat insulating contact bearer, and which is secured on the intake manifold in an electro- and heat conducting manner by means of a securing structure, wherein the bottom side of the body engaging the contact barrier, contains PTC pills which are electrically connected to a current conductor by means of a resilient contact, and which are secured on said bottom in an electrical and heat conducting way.

Such a device is generally known.

The drawback of the known devices is that the evaporation, distribution and mixing of the fuel mixture are not optimal as the heat, generated by the preheater, is not transferred homogeneously and quickly to the fuel mixture. Moreover it is not possible to add the maximal quantity of the developed heat to the fuel mixture, because of the configuration and sizes of the bottom of the preheater and the embodiment of the securing means with which the preheater is secured in the intake manifold.

BRIEF SUMMARY OF THE INVENTION

The invention tends to abolish these drawbacks and to provide such a preheat device which provides improved heating of an air-fuel mixture being furnished to an engine.

For that purpose the device is characterized in that the bottom of the main body of the device has such a thickness and shape that during pre-heating of the fuel mixture the device effects a homogenous heat conducting to the fuel mixture, that the side wall is provided with particular securing means forming said securing structure of the preheater and having such a thickness that together with said securing means it provides a required heat resistance with respect to the transfer of device heat from and to the intake manifold.

By using said features, the maximal quantity of heat is transferred quickly to the fuel mixture and the necessary heat is concentrated in the part (the thick bottom) of the preheater body that contacts the fuel mixture. The configuration of that part may be selected such that the required heat transfer and flow resistant of the fuel mixture are more advantageously effected. The wall thickness and the mass of the remaining part of the preheating body are as slight as possible and direct metal-to-metal contact with the manifold takes place only at the securing means which are of relatively small size. Thereby, compared to the known preheaters of comparable sizes, in the event of the same or even less energy consumption, the efficiency of the mixture-heating increases. By placing rings between each of the securing means and the intake manifold, the heat transfer from and to the intake manifold can be controlled up to a certain extent. Because of this on the one hand an optimal heat transfer to the mixture is obtained when switching-on the fuel mixture heating. On the other hand, when the fuel mixture heating is switched-off and, in the event of a warm intake manifold, the switched-off fuel heater is held sufficiently at the ambient temperature (intake manifold). Another advantage is that because the main mass of the preheater is in its bottom, the possibility is created to use PTC pills of a smaller number and/or size.

The preheater of the invention is also adapted for use also in other fields.

DESCRIPTION OF THE PREFERRED EMBODIMENTS

Figure 1:
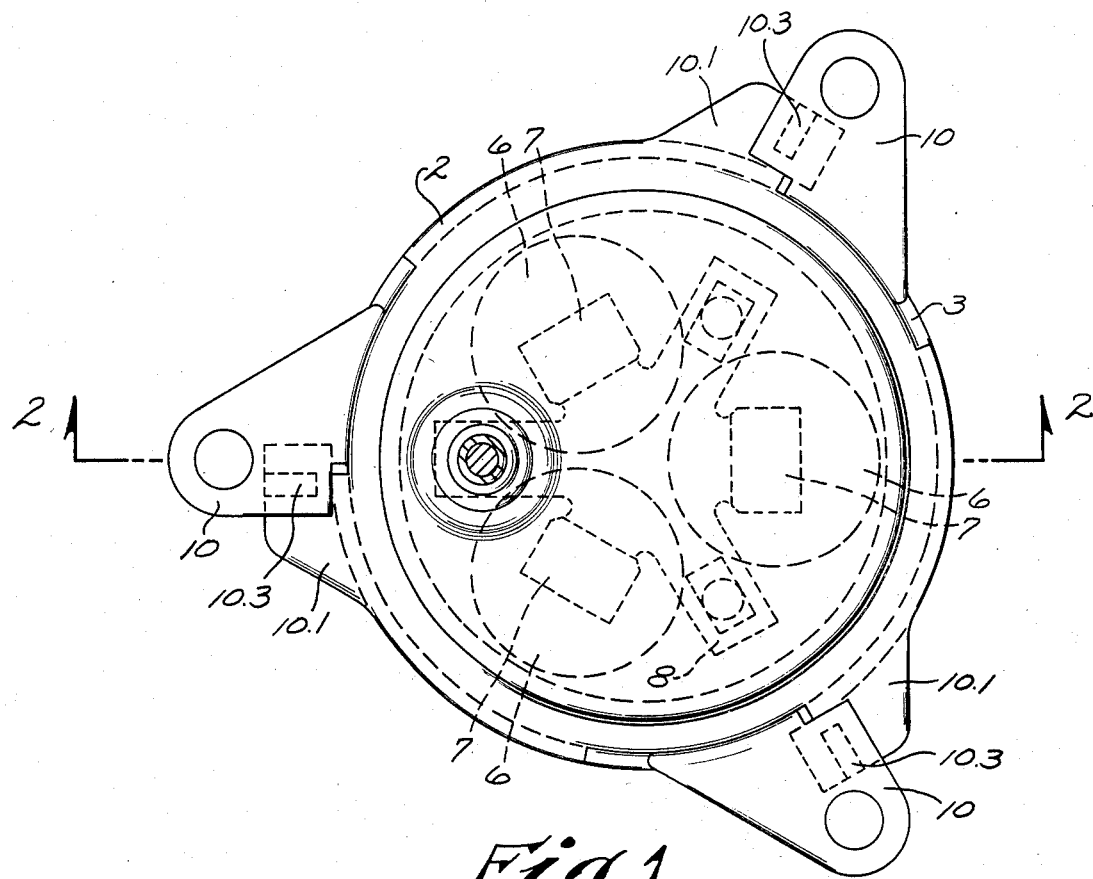
FIG. 1 shows schematically a plan view of a preheater according to the invention, in which the intake manifold is omitted; n
Figure 2:
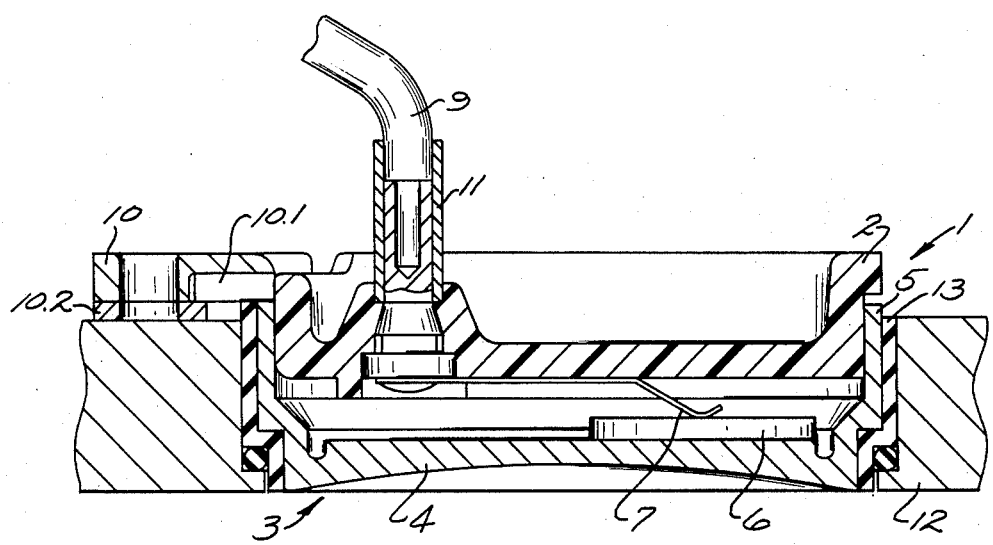
FIG. 2 shows in cross-section, a view along line II-II of the preheater of FIG. 1 together with a part of an intake manifold mounting the preheater.
Figure 3:
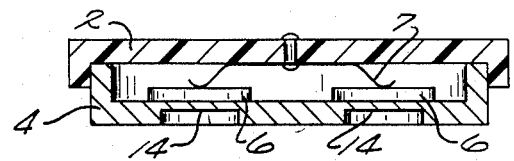
FIGS. 3 and 4 show cross-sections of other alternate bottom configurations of the preheater, adapted to specific uses.

Referring to the drawings, the preheater 1 according to the invention comprises two principal parts: a contact bearer 2 of an electrical and thermal insulating material, and a cylindrical body 3 of a thermal and electrically conducting metal material. The cylindrical body contains a bottom 4 and a thin side wall 5, the mass of the bottom being considerably larger than that of the side wall. The bottom 4 extends in a plane in the bottom of an intake manifold 12, typically of metal, in a combustion engine, the manifold being shown inserted for convenience of illustration. On the side of the bottom facing the contact bearer 2, PTC pills 6 (3 in the illustrated embodiment) are arranged in an electrical and heat conducting relationship to the body. The PTC pills are connected to terminal means on the contact bearer 2 by means of resilient contacts 7. Preferably the plurality of resilient contacts are formed integrally with each other in the form of a star-shaped member 8 which is riveted on the contact bearer 2 at the location of the point of connection 11 of the electric current conductor 9. The cylindrical body 3 is provided with securing means 10 of a size relatively limited with respect to the size of the body 3 to secure it on the intake manifold by means of screws. In the illustrated embodiment the securing means 10 are formed as eyelets. The preheater further includes a packing ring means 13 between the securing means and the intake manifold, the packing ring means 13 preferably comprising a metal sleeve of stainless steel or the like of poor thermal conductivity or a thermally insulating organic or ceramic material or the like with which heat flows between the body 3 to and from the intake manifold 12 is controlled and limited. Preferably the eyelets 10 are arranged to fit over ears 10.1 on the contact bearer 2 which fit under the eyelets, whereby the bearer is easily fitted into the body 3 and rotated for locking detents 10.3 of the ears under the eyelets to secure the body and bearer together. If desired washers 10.2 further limit thermal transfer from the body 3 to the manifold 12. In the alternate embodiment shown in FIG. 3, the body bottom 4 is provided with thinner portions 14 at the location of the PTC elements 6. Thus a quick evaporation of droplets, particularly at the PTC elements, is obtained.

Figure 4:
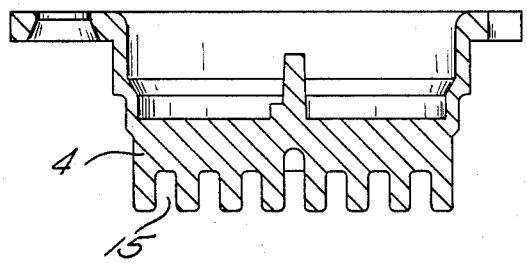
Figure 5:
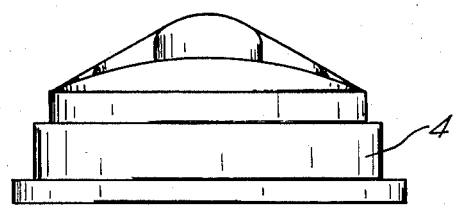
FIGS. 5 and 6 show a side elevation view and a bottom view respectively of the device of FIG. 4.
Figure 6:
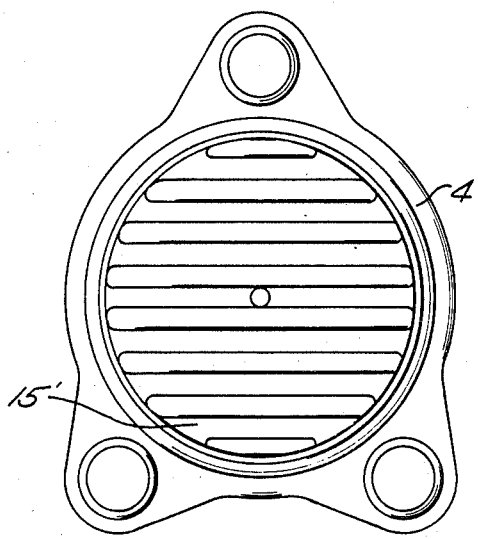

In the embodiment shown in FIGS. 4, 5, and 6, the bottom 4 is provided with slots 15 which enable an optimal evaporation of fuel droplets in the air-fuel mixture while maintaining a low flow resistance.

The contact bearer and the cylindrical body can be easily mounted and dismounted. On the one hand the mass of the bottom should not be too large in view of the provision of as fast a heat discharge to the fuel mixture as possible, on the other hand the bottom should not loose the heat too quickly with respect to maintaining a certain heat capacity (buffer effect). As has been indicated before, the configuration of this bottom is determined to a high degree by the specific application requirements. The contact bearer is desirably secured to the body 3 by means of the turn/click releasable connection as shown.

The thickness of the side wall 5 of the cylindrical body should be such that an electric contact to the manifold is present, or an individual contact (not illustrated) should engage the body, when said side wall serves as thermally control and electric connection, and that during operation of the engine and in the event of an inactive preheater a predetermined quantity of heat of the engine can be added to the side wall.

The present preheater needs no thermal shield plate as is required in the known preheaters. The use of such a shield plate would be attended with heat losses, because it also gives out a part of the heat, developed by the PTC pills.

In the event that an insulating packing is arranged between each one of the securing means and the intake manifold, the flow of electricity and heat takes place via securing means, like screws and the like, arranged in said securing means.

I claim:

1. A device to preheat fuel being furnished to an engine comprising a metal body to be mounted in a cavity in a wall of an intake manifold, the body having a bottom with an outer surface to be exposed to fuel in the intake manifold for heating the fuel and with an inner surface and having a side wall extending around the inner surface, means for securing the body to the intake manifold, an electrical resistance heater pill of a material of positive temperature coefficient of resistivity disposed in thermally conducting relation to the inner surface of the body bottom, and a contact bearer having a portion of electrical insulating material secured to the body holding an electrical conductor in resilient electrical contact with the heater pill, characterized in that the body side wall cooperates with the inner surface of the bottom of the body for defining a body cavity, a plurality of detents are provided on the body side wall in spaced relation to each other, and the contact bearer has a configuration corresponding to the body cavity and has the electrical conductor secured thereto, the contact bearer having a configuration to be received within the body cavity and rotated under the detents for removably attaching the contact bearer in the body cavity with the electrical conductor in resilient electrical contact with the heater pill.

2. A device according to claim 1 characterized in that the body side wall is cylindrical for defining a cylindrical body cavity, and the contact bearer has said portion formed of an electrical insulating material having a cylindrical configuration closely fitted within the body cavity for rotation therein.

3. A device according to claim 2 characterized in that the securing means comprise a plurality of eyelets provided in spaced relation to each other on the body side wall, the eyelets respectively incorporating the detents.

4. A device according to claim 3, characterized in that the device comprises a thermally insulating packing to be arranged between each one of the securing means and the intake manifold.

5. A device according to claim 4, characterized in that the device comprises a plurality of stainless steel washers to be disposed between the respective securing means and the intake manifold.

6. A device according to claim 5, characterized in that a plurality of heater pills are disposed in thermally conducting relation to the inner surface of the body bottom and the electrical conductor comprises a plurality of contacts formed integrally with a resilient star-shaped member.

7. A device according to claim 6, characterized in that said thermally insulating packing is formed of electrical insulating material for electrically insulating said side wall from the intake manifold and the securing means provide separate limited contact for electrically connecting the resilient contacts to a manifold while limiting heat transfer to the intake manifold.

8. A device according to claim 1, characterized in that the outer surface of the bottom of the body is intersected with fuel-droplet-collecting slots adapted to extend in the direction of fuel flow in the intake manifold.

9. A device according to claim 6, characterized in that at the location of the heater pills the bottom is provided with thinner sections.

* * * * *